United States Patent [19]
Herbert

[11] Patent Number: 6,121,761
[45] Date of Patent: Sep. 19, 2000

[54] FAST TRANSITION POWER SUPPLY

[76] Inventor: Edward Herbert, 1 Dyer Cemetery Rd., Canton, Conn. 06019-2029

[21] Appl. No.: 09/336,897

[22] Filed: Jun. 21, 1999

Related U.S. Application Data

[60] Provisional application No. 60/091,761, Jul. 6, 1998.

[51] Int. Cl.[7] .............................. G05F 1/40; H02M 3/335
[52] U.S. Cl. ............................ 323/282; 323/222; 363/16
[58] Field of Search ................................... 323/282, 222, 323/285, 284, 283, 287; 363/60, 16, 59, 15, 34, 21, 97

[56] References Cited

U.S. PATENT DOCUMENTS

| | | | |
|---|---|---|---|
| 4,665,357 | 5/1987 | Herbert | 323/361 |
| 5,132,895 | 7/1992 | Kase | 363/60 |
| 5,481,238 | 1/1996 | Carsten et al. | 336/214 |
| 5,682,303 | 10/1997 | Goad | 363/71 |

*Primary Examiner*—Rajnikant Patel

[57] ABSTRACT

A fast transition power supply comprises three control functions, one to maintain steady state conditions, a voltage transition circuit that rapidly changes the charge on the output capacitor to effect a rapid step change in the output voltage, and a current control circuit that can switch a constant current in a pulse width modulation control from zero (or negative) current to any current less than the maximum rated current with no change of current in the inductors of the circuit. The power supply can thus go from zero volts, no current to full output voltage, full current very quickly, in the order of less than an micro-second. It can also transition from full voltage, full current to zero voltage, zero current just as fast, or transition from one voltage to another.

11 Claims, 5 Drawing Sheets

FAST TRANSITION POWER SUPPLY

This application claims benefit of Provisional Application Ser. No. 60/091,761 filed Jul. 6, 1998.

BACKGROUND OF THE INVENTION

Prior art power supplies have limitations under conditions of changing loads or changing output voltage, particularly if the load is decreased at the same time that the output voltage is changed to a lower voltage as by an external programming command. Under conditions where the load decreases significantly or goes to zero, and the voltage is commanded to go to a lower value or zero, a prior art power supply would very likely have a spike upward in output voltage followed by a slow decrease to a final value, because of the time needed to discharge stored energy in the output filter inductor and capacitor.

OBJECT OF THE INVENTION

It is an object of the present invention to teach a power supply in which the output current can transition arbitrarily fast between any levels of load current which are less than the design maximum load current, including zero current, without significant voltage overshoot or undershoot. It is a further object of the present invention to teach a power supply which can transition very rapidly between voltage levels, including zero, when so commanded, regardless of the output current or changes thereof.

It is a further objective of the present invention to teach a power supply which may be a modular power supply having a "front end" module at one location, and one or more remote output modules located near the load(s), and which can change its output voltage and/or its load from minimum to maximum, or vice versa, without large changes in the energy in the interconnecting conductors. This can help to reduce EMI (electromagnetic interference) as well as facilitate very rapid changes in the output voltage and/or load.

As in many prior art power supplies, the power supply of this invention uses control of the current into the output capacitor as the steady state voltage control, to adjust for parametric variations and other errors. However, the current control is implemented so that there is no change in the current through inductive components (neglecting parasitic inductances), so the current into the output capacitor can change very rapidly in response to changes in the output current so that the capacitor voltage does not droop or spikevarying Also, the voltage control during transient voltage changes requires no change in current through inductive components (neglecting parasitic inductances). Instead, the charge on the output capacitor is changed to step the output voltage up and down, and the control of the current flowing into the output capacitor needs only maintain the new correct voltage after the transition.

The principle power source for the power supply of the present invention is one or more constant current sources. One skilled in the art of power converters would know how to design and make a constant current power source that would be suitable as a front end for this invention. As an example, not a limitation, a modified buck converter operated in a constant current mode would be suitable. The constant current source may be fixed at a current equal to, or somewhat above, the maximum specified current output. The current from the current source is then pulse width modulated to the output capacitor and the output of the power supply, where the duty cycle of the pulse width modulation approximately equals the percent of full load of the output current. The frequency of the pulse width modulation and the value of the output capacitance determines the ripple voltage on the output.

Energy stored in the inductors of the power supply of this invention is not varied (except under special circumstances), so no time is lost ramping up or ramping down the inductor currents.

While the output voltage can be adjusted under feed back control by adjustments in the current control duty cycle, the fast transition of the output voltage of the power supply of this invention is accomplished by changing the charge on the output capacitors. The total output capacitance is fixed in value, but it comprises a parallel combination of capacitors which can be switched to transfer charge very quickly. Some power is lost during the voltage transitions, and a voltage source supplies this power.

Thus, there are three relatively independent control mechanisms. First there is a steady state current modulation to maintain voltage. Second, there is a very fast control of current, which may respond very quickly to changes in the load impedance. Third, there is a very fast control of charge on the output capacitor, to change the output voltage very quickly when so commanded by an external voltage command input. The power supply of this invention can transition from a high voltage at full load to a low voltage at zero load very quickly, in the order of less than a microsecond, without significant lag or overshoot.

DESCRIPTION OF THE PREFERRED EMBODIMENT OF THE INVENTION

Figure 1:
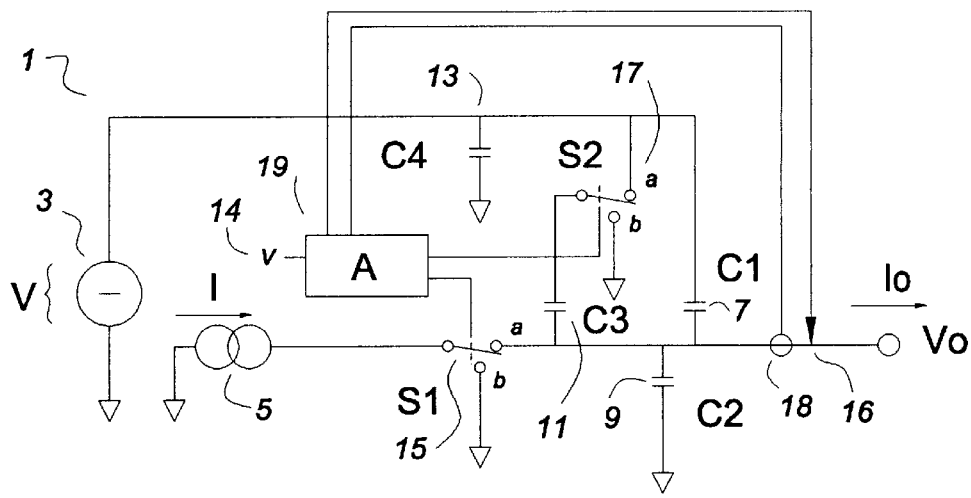
FIG. 1 is a schematic of a basic power supply of this invention.

Most power supplies are voltage sources having a low output impedance. The output voltage may be fixed, or it may be variable, responsive to an external voltage programming command. The low output impedance is usually achieved by using an output capacitor. The output current of the power supply is usually dependent upon the load impedance, which is usually a varying load impedance, and the power supply control circuits must react to variations in the varying load impedance, by increasing or decreasing the current into the output capacitor so as to maintain the desired output voltage.

Ideally, if the load impedance changes, causing a change in the output current, the current into the output capacitor would change instantaneously to an equal value current. In that case, the current into the capacitor and the current out of the capacitor would be equal at any instant, leaving the stored charge on the output capacitor unchanged, so the output voltage would be unperturbed. This is not achieved in prior art power supplies for two reasons: First, most control circuits do not measure output current, but rather react to a change in the output capacitor voltage caused by the change in output current. Thus there is an inherent lag, and the circuit must "catch up" after an error is detected. Second, in most cases the current into the output capacitor is dependent upon the current stored in an inductor, and that current cannot change instantaneously. Therefore, even in those circuits that do sense and respond to changes in the output current, there is still a lag due to the time constant of the inductor circuit.

In a typical prior art power supply, a decrease in the load impedance will cause an increase in current, which will be supplied initially by removing charge from the output capacitor, causing its voltage to drop. The voltage will continue to decrease until the current into the output capacitor can be increased sufficiently to equal the output current, and it will have to increase even more to restore the charge on the capacitor to return the output voltage to its correct value. The current must then decrease to equal the output current to maintain the correct voltage, or an "overshoot" will occur. A similar, but opposite sequence of events occurs if the load impedance increases. If the change of the output impedance is large, and the circuit responds slowly, the output voltage may transition out of an acceptable range, too low or too high. The former may cause loss of function, the latter may be destructive.

In a typical prior art power supply with a programmable output voltage, the same circuit elements can cause a significant lag in achieving a new steady state output voltage following a command to change the output voltage. To increase the output voltage, the current into the output capacitor must be increased and maintained for the correct time to transfer more charge to the output capacitor, then the current must decrease to equal the output current. Likely, the output current will be higher than it was before the voltage change, though, due to the higher voltage. Regardless, there is a lag because the current into the output capacitor cannot change instantaneously in the inductive components. To respond to a command to a lower output voltage is even more problematical. The current into the output capacitor must be reduced, and the voltage will bleed down due to the current into the load. If the load impedance is high, this may take a long time.

An even worse case would be a simultaneous command to a lower voltage (or zero volts) and an increase in the load impedance (or an open circuit). Likely, the voltage would increase first, then trail off slowly to the lower value.

It is quite common to use modular power supplies in which a front end power supply interfaces with commercial power or telecommunications power and provides partial power conditioning to power one or more output power modules. If the output load has very fast changes in load, as is common with newer microprocessors, there may be severe transients in the conductors between the front end module and the output modules. These transients can compromise stability, and may cause EMI. Often a large number of filter capacitors must be used in the output module to moderate the transients.

The power supply of this invention solves these and other problems, as will be described below. The circuit will be developed incrementally, with several partial circuits being described. The preferred embodiment of the invention utilizes all of the several partial circuits, but there will be applications in which some of the partial circuits may be used alone or with fewer than all of the other partial circuits, depending upon the specification of the power supply being designed. As an example, not a limitation, the circuit which accomplishes very fast transitions of the output voltage could be used with an otherwise usual power supply of prior art without the fast current transition circuits, or the fast current transition circuits could be used without the fast voltage transition circuits.

FIG. 1 shows a basic power supply 1 of the present invention. A current source 5 is the principal power source driving an output current Io. A switch S1 15 pulse width modulates the current I from the current source 5. The current source 5 has a constant current I equal to the maximum specified output current Io of the power supply. A second switch S2 17 can change the charge very quickly on an output capacitor C2 to cause a very rapid step in the output voltage Vo. A control A 19 may sense the output current Io using an output current sensor 18 and may also sense the output voltage Vo using a voltage sensor 16 to implement a control algorithm to control the timing of the switches S1 15 and S2 17. The control A 19 may also have an external voltage command input v 14. An optional second output capacitor C1 7 helps control the initial state of the output voltage when power is applied. At steady state conditions, it is in parallel with the output capacitor C2 9 for analytical purposes, and a recitation in this specification or the claims of "output capacitance" or "output capacitor" includes these capacitors which are in parallel for AC circuit analysis, as would be known by one practiced in the art of power supplies and AC circuit analysis.

If the output current Io is less than the specified maximum current, the switch S1 15 operates so as to bypass the current I from the current source 5 to ground during part of time. If the duty cycle of the switch S1 15 is defined as the percentage of time that it is in position a, then the duty cycle is approximately equal to the percentage of the output current Io to the maximum current I.

As an example, not a limitation, let us assume that the maximum output current I of the power converter 1 is 10 amperes. Let us further assume that at some instant, the output Io is 6 amperes. The output current is 60% of the maximum output current, and the duty cycle of the switch S1 15 would be approximately 60%. Usually, the output current is determined by the output voltage Vo and the impedance of the load, which can vary. There are several ways in which the duty cycle of the switch S1 15 could be controlled. One would be to use feed forward of the output load current Io. An output current sensor 18 may sense the output current Io, and the control A 19 may determining its percentage of the maximum load I, and immediately reset the duty cycle of the switch S1 15 to new values as the output current Io changes.

Further, an output voltage sensor 16 may sense the output voltage Vo, and a slower feedback circuit in the control A 19 may compare the output voltage Vo to its desired value so as to fine tune the duty cycle, to compensate for losses and parametric errors. However, control of the duty cycle of switch S1 15 is not the principle method of voltage control when the output voltages steps rapidly under external voltage program control, as will be explained below.

Another way to control the duty cycle of switch S1 15 would be to sense the voltage on the output capacitor C2 9. A hysteretic control in the control A 19 could compare the value of the output voltage Vo against its desired value. If it is too low, the switch S1 15 can be closed (put in position a). If it is too high, the switch S1 15 can be opened (put in position b). Some small hysteresis should be used, to keep the switch S1 15 from cycling too fast. This method has inherent control to adjust the output voltage Vo, to compensate for losses and parametric errors. However, control of the duty cycle of switch S1 15 is not the principle method of voltage control when the output voltages steps rapidly under external voltage program control, as will be explained below.

As an example, not a limitation, consider a power supply having a nominal 2 volt output Vo with a maximum ripple voltage of 20 mV peak to peak. Consider further that the maximum output current I is 10 amperes, and the present output current Io is 6 amperes due to the present impedance of the load impedance. As the output current is 60% of maximum, the duty cycle of the switch S1 15 would be approximately 60%. When the switch S1 15 is in position b, the net current out of the output capacitors would be 6 amperes. When the switch S1 15 is in position a, the net current into the output capacitors would be 4 amperes, the instantaneous difference between the current I of the current source 5 and the output current Io.

Given the allowed ripple of 20 mV peak to peak, the operating frequency of the switch S1 15 and the value of the output capacitors can be determined. If one assumes a switching frequency of 1 MHz, then the charging and discharging times are 600 ns and 400 ns respectively, given the 60% duty cycle of the present example. Using the well known equation for the voltage on a capacitor, $\Delta V = \Delta Q/C$, where V is the voltage, Q is the charge in coulombs, and C is the capacitance in farads, and knowing that $Q = I\,t$, where I is the current in amperes and t is the time in seconds, the value of the output capacitors can be solved. In the present example, $\Delta V$ is 0.02 volts, I=4 amperes, and t=0.0000006 seconds, C therefore equals 120 uf minimum. In the power supply 1 of FIG. 1, the capacitance is the sum of the values of the capacitors C1 7, C2 9 and C3 11, because they are effectively in parallel for the purposes of circuit analysis.

If the output load impedance changes, requiring a different output current Io, the duty cycle can be changed just a quickly as the change in the output current Io can be detected. If the output current Io goes to zero, the duty cycle can go to zero immediately, too.

A supply with a programmable voltage and very fast load current changes may have several alternative states of standby status, and the several alternative states may have alternative maximum output currents. To be on full standby, able to output full load current in a fraction of a microsecond, faster than the output capacitance can droop significantly, the current I of the current source 5 of FIG. 1 must be at full load current continuously. There will be some losses in this constant current which must circulate constantly at full value, but an ideal short circuit dissipates no power. With fairly heavy conductors and good, low impedance switches, the power losses can be minimized. The peak voltage is lower on the switches, so lower voltage rated switches can be used and the drive circuits do not need to drive as large a "Miller capacitance" in the gate, if the switches are MOSFET switches.

In some applications, there may be alternative standby states having a reduced state of readiness where a much lower alternative maximum output current could be used, and where enough time could be allowed for the input current I to ramp other alternative maximum output current values if, for example, a higher state of readiness was anticipated. If so, the current I could be reduced under program control, to a lower level, to whatever current might be required nearly instantly for that standby state. As an example, not a limitation, a power supply for a microprocessor having an idling state for the processor, that alternative maximum output current might be a small percentage of normal full load output current Io.

As mentioned above, the output voltage Vo can be controlled by changing the duty cycle of the switch S1 15 to provide more or less current to the output capacitor under by the control A 19. However, this is inadequate for changing the voltage very rapidly under external voltage programming control, particularly for a decrease in voltage occurring at the same time as a decrease in the output current Io. It is even worse if the output current Io decreases to zero, because even at zero duty cycle, there is no mechanism to rapidly remove charge from the output capacitor. This invention teaches that a preferred method of changing the output voltage Vo is by changing the charge on the output capacitors C1 7, C2 9 and C3 11. In the present example of the power converter 1 of FIG. 1, this is accomplished by changing the state of a switch S2 17 in response to a voltage command input v 14 to the control A 19.

Figure 2:
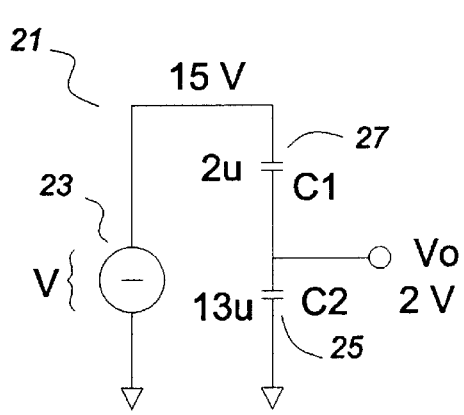
FIG. 2 shows a capacitance voltage divider.
Figure 3:
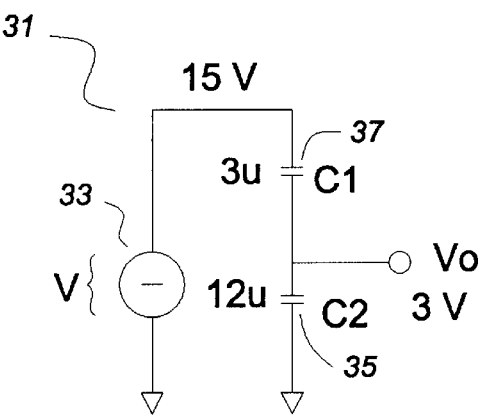
FIG. 3 shows another capacitance voltage divider
Figure 4:
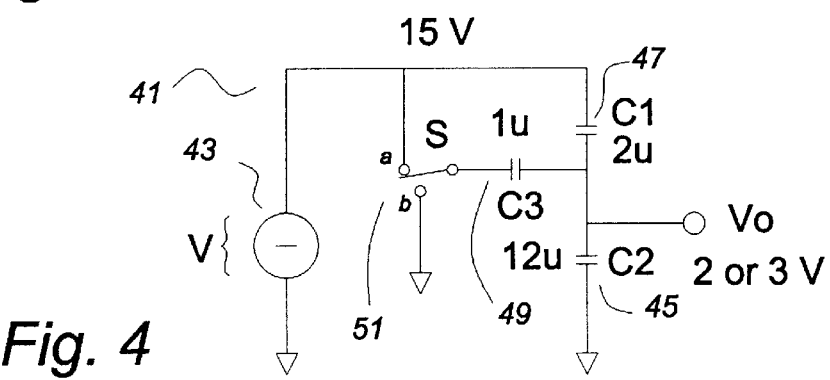
FIG. 4 shows a capacitance voltage divider, part of which is switchable.

This can be understood with reference to FIGS. 2 through 4. FIG. 2 shows a capacitor divider circuit 21 comprising two capacitors C1 27 and C2 25, and a voltage source 23. For the present example, as an example, not a limitation, consider that the voltage V of the voltage source 23 is 15 volts, the components are ideal, and no current flows in the output Vo. Consider further that the value of the capacitor C1 27 is 2 uf, and the value of the capacitor C2 25 is 13 uf. One can solve for the output voltage Vo as 2 volts using equations well known in the are of electrical circuit analysis. (Rigorously, this is an approximation, valid only for AC voltages, but it is approximately right for DC voltages under transient conditions. The circuits being explained here control the voltage during transitions in the output voltage).

FIG. 3 shows a capacitor divider circuit 31 comprising two capacitors C1 37 and C2 35, and a voltage source 33. For the present example, as an example, not a limitation, consider that the voltage V of the voltage source 33 is 15 volts, the components are ideal, and no current flows in the output Vo. Consider further that the value of the capacitor C1 37 is 3 uf, and the value of the capacitor C2 35 is 12 uf. One can solve for the output voltage Vo as 3 volts.

Consider now FIG. 4. The power supply 41 is very similar to the circuits of FIGS. 3 and 4, with the addition of a switch S 51 and a capacitor C3 49. FIG. 4 shows a capacitor divider circuit 41 comprising two capacitors C1 47 and C2 45, and a voltage source 43. For the present example, as an example, not a limitation, consider that the voltage V of the voltage source is 15 volts, the components are ideal, and no current flows in the output Vo. Consider further that the value of the capacitor C1 47 is 2 uf, the value of the capacitor C2 45 is 12 uf, and the value of C3 49 is 1 uf.

It can be seen that if the switch S 51 is in position b, the voltage divider circuit 41 is electrically equivalent to the voltage divider circuit 21 of FIG. 2. It can be seen that if the switch S 51 is in position a, the voltage divider circuit 41 is electrically equivalent to the voltage divider circuit 31 of FIG. 3. In either switch position, the value of the output capacitance is equal the sum of the values of the capacitors C1 47, C2 45 and C3 49, or 15 uf in the present example. By selecting the position of the switch S 51 when voltage is first applied, the initial value of the output voltage Vo can be selected to be either 2 volts or 3 volts. By changing the position of the switch S 51, the voltage can be changed from 2 volts to 3 volts and back again, at will. (This is an approximation, and ignores the effect of the output voltage change on the amount of charge transferred).

Given that ideal components have been recited in this example, an infinite current will flow for zero time, and the output voltage will change instantaneously. That is not possible in practice, but very fast transition times are possible. Solid state switches, such as, as examples, not limitations, MOSFET's, SCR's, IGBT's, NPN and PNP transistors, can handle very large currents for short times, and good quality capacitors can be charged and discharged very rapidly. A 120 ampere current could change a 120 uf capacitance by one volt in one microsecond. That current level would not be unreasonable as a short non-repetitive peak current in a solid state switch, even quite a small one in an integrated control and switching circuit.

In the present example of FIG. 4, when the switch S 51 switches from position a to position b, a large current spike is conducted to ground. Also, when the switch S 51 switches from position b to position a, a large current spike is conducted from the voltage source 43. To limit this current spike in the interconnection between the voltage source 43 and the switch S 51, it is preferred to have a large capacitor close to the switch. With reference to FIG. 1, the capacitor C4 13 serves this purpose, and, in a practical circuit, there might be some filtering between the capacitor C4 13 and the voltage source 3. It can be seen that the switch S2 17 and the capacitor network comprising capacitors C1 7, C2 9 and C3 11 have the same relationship and purpose as the corresponding components in FIG. 4. Therefore, rapid transition of the output voltage Vo in the power supply 1 of FIG. 1 can be made by changing the state of the switch S2 17. The voltage levels will be determined by the relative values of the capacitors C1 7, C2 9 and C3 11, and the voltage V of the voltage source 3.

The optional capacitor C1 7 forms a capacitor divider with capacitor C2 9 and capacitor C3 11, and if the voltage source V 3 is applied upon power initialization, the capacitor divider will establish the initial voltage on the output. The position of the switch S2 17 alters the capacitor divider, so alternative initial voltages may be selected by the operation of the switch S2 17. If the optional capacitor C1 7 is not used, the capacitor divider will comprise the capacitor C2 9 and C3 11 if the switch S2 17 is in position a, but the capacitors will not be connected to the voltage source V 3 if it is in position b. This is the preferred configuration if the circuit is to be used to make step transitions between zero volts and a predetermined output voltage, and back. Such a power supply would remain at zero volts (assuming that S 15 remains in position b) until the switch S2 17 changed state, then the output voltage would transition in a very rapid step to the voltage determined by the voltage divider. Assuming that S1 15 begins modulating the current in exact proportion to the output current Io to the maximum rated current I, the power supply will "instantly" be on and stable. Operating in reverse, simultaneously switching S1 15 to position b and switching S2 17 to position b would cause the output voltage to step to zero regardless of the load, and the output current would go to zero.

Thus, in the example of the power supply 1 of FIG. 1, step transitions in the output voltage Vo and the output current Io are independently controlled, and, to a large extent, a change in one does not directly effect the other. Switching S2 17 can result in near instant changes of the output voltage Vo, regardless of the output current Io. Switching S1 15 can respond to a change in the output current Io nearly instantly, regardless of the state of the output voltage Vo. Granted, an increase in voltage will cause an increase in current if the load remains the same. However, as an example, a load could be reduced nearly simultaneously with a programmed reduction in voltage, and the circuit can respond to the independent variables nearly instantly, with very minimal output voltage transients other than the desired step changes (without significant overshoot or undershoot).

In order for the circuit to operate as described, the capacitance of the load must be small compared to the output capacitor of the power supply. This is often the case. A large capacitive component in the load will affect the voltage transition circuit because the capacitance will add to the value of the internal capacitors. When the switched capacitor changes state, an approximately fixed charge is transferred to or from the output capacitor. If the effective size of the output capacitor is increased by the addition of a capacitive load, the voltage step due to the fixed charge will be smaller. This problem can be solved in several ways. This is also an appropriate time to address some other errors in the circuit.

The problem of the external load capacitor can be solved by reducing the internal output capacitor by a corresponding amount. However, this may not be practical for manufacturing. A better idea is to design the power supply so that a part of the output capacitor is externally connected when the power supply is installed, and that externally connected capacitor can be sized so that the sum of the internal capacitor, the load capacitance and the externally connected capacitor equals the proper value.

Figure 6:
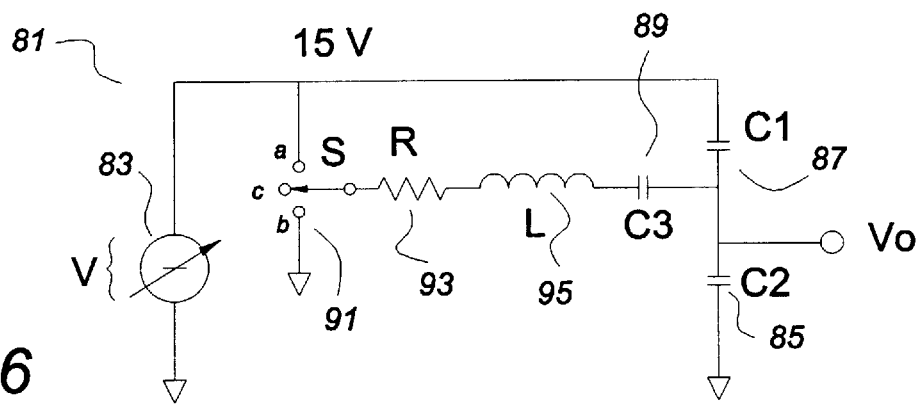
FIG. 6 shows the circuit of FIG. 5 with an inductor.

Another way of compensating for an increase of output capacitance due to the capacitance of the load is to increase the voltage of the voltage source in the capacitor switching network. This will increase the charge transferred during switching. This voltage could be adjusted, as by a trim, at installation, or a feedback circuit could adjust the voltage source voltage as necessary to maintain the correct step voltage. A variable voltage source V 83 is shown in FIG. 6, and is discussed further below.

Typically, there will not be a need to have the voltage transition circuit operate with high precision. If the voltage steps are slightly off, the feed back control of the current modulation can correct it. For those applications which may require better precision, some of the approximations above may be refined. First, the charge transferred by the switched capacitor is affected by the change in the output voltage. To minimize this effect, the voltage source for the capacitor switches is preferably large compared to the voltage step. Further, the size of the capacitor may be increased slightly, the percentage amount being approximately the percentage of the step voltage to the supply voltage. To eliminate the second order effects, the use of a good circuit analysis computer program may be beneficial.

It is noteworthy that the level of the voltage before or after the switched step voltage level change occurs is not controllable by this circuit. The steady state voltage must be maintained by other means, such as by modulating the current into the output capacitor. The size of the step is relatively independent of the starting or ending voltage. The size of the step can be adjusted by changing the voltage source in the capacitor switching network, or by changing the size of the output capacitor.

Figure 5:
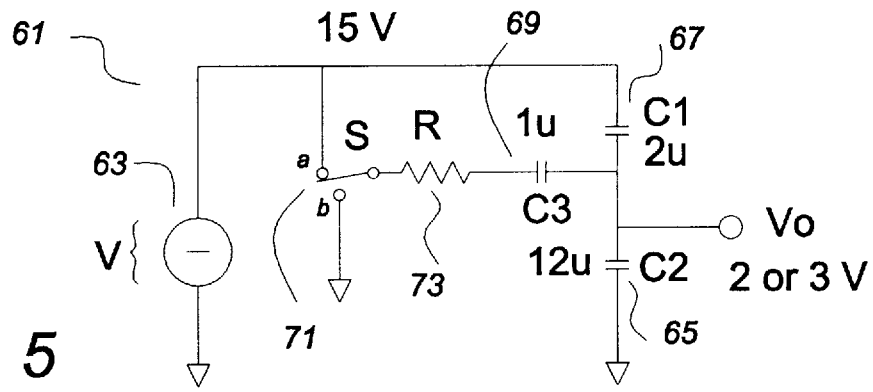
FIG. 5 shows the circuit of FIG. 4 with a resistor.

FIG. 5 shows a capacitance divider circuit 61 which is the circuit of FIG. 4 with the addition of a resistor R 73. This resistor R 73 may represent the practical resistance of the switching means S 71, for example, not as a limitation, the Rds of a MOSFET, or it may be a resistor component, or both. It can be shown that the resistor R 73 does not effect the final output voltage Vo after the switch S 71 changes state, but it does limit peak currents and slows the transition time. Because real circuits are inductive to an extent, it is preferred that some resistance be incorporated in the circuit to prevent ringing. That is, it is preferred that any resonant circuits due to parasitic reactances be damped or over damped.

Energy is lost with each transition of the output voltage, but it is not significant if the output voltage level is stepped only occasionally. The components have to be able to handle the peak currents, but these peak currents can be moderated by the choice of the value of a series resistor. If the output voltage level is cycled rapidly, then the power loss may be significant. In that case, the components would have to be rated to handle the power, and heat sinking may be necessary. The voltage supply for the capacitor switch network would have to be more robust, and care would have to be taken to control EMI.

For a power supply where the voltage changes were relatively infrequent, the voltage supply for the capacitors would not have special requirements. It could probably be taken from the "house keeping" supply of the power supply.

FIG. 6 shows a capacitor divider circuit 81 which is the circuit of FIG. 5 with the addition of an inductor L 95, and with the switch S 91 having a third state which is an open circuit, position c. When capacitors are charged and discharged resistively, losses occur. When a capacitor is charged and discharged resonantly, the energy is stored momentarily in the inductor, and is then returned to the circuit. Uncontrolled, this produces oscillation, but if the switch S 91 is opened when the charging current becomes zero, oscillation is prevented, and the stored energy remains on the capacitor. While this quasi-resonant circuit will reduce the losses, it greatly complicates the analysis. The voltage after the change of state will depend upon the Q of the circuit (the amount of dampening), as the capacitor will tend to peak charge to a higher level. This can be compensated by adjusting the values of the components. Because C3 89 is in series with an open switch, at steady state conditions, C3 89 is not in parallel with the output capacitance.

It is noteworthy that a high accuracy is not necessary to derive considerable benefit from these circuits. Let us assume, as an example, that a quasi-resonant arrangement is used, and that, with the original capacitors, the voltage peak charged 50% higher than desired. In finalizing the circuit, this can be compensated in several ways. If the switched capacitors are reduced by one third, the output voltage steps will have a corresponding decrease. If the output capacitance is increased by one third, the voltage steps will similarly have a corresponding decrease. If the source voltage V 83 for the switching capacitors is reduced by a third, the voltage steps will have a corresponding decrease. These remedies can be used in any combination to adjust the voltage steps. None of these measures control the steady state voltage of the output, and this circuit must be understood to be a partial circuit which will be incorporated into a power supply to provide fast voltage transients as a supplement to the other components and functions of the power supply.

There is a point of diminishing returns in trying to make the voltage steps accurate. If it is not done quite perfectly, due to circuit variations or miscalculation, the step change in voltage may be off, as an example, 20% of the desired transient. In other words, if it were desired to transition from 2 volts to 3 volts, the actual outcome might be 2.8 volts or 3.2 volts. The voltage would then have to be corrected by the feedback circuit, ramping 0.2 volts to the correct level. Note, however, that this is still a great improvement over a circuit that did not use these techniques. In a prior art circuit, the voltage would have had to ramp the entire 1.0 volts.

Figure 7:
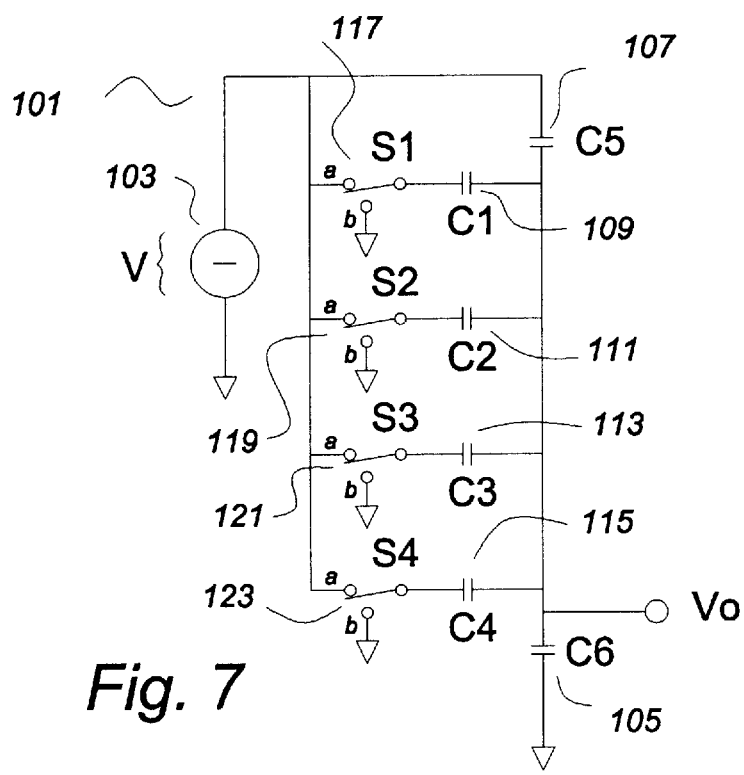
FIG. 7 shows a capacitor divider with four switchable capacitors.

In the above examples, the output voltage Vo can be stepped between two states. This may be useful in some applications, but a power supply that can step between many output voltage states would be more versatile. FIG. 7 shows a capacitor divider circuit 101 which is similar to the capacitor divider circuit of FIG. 4 except that there are four capacitors C1 109 through C4 115, switched by four switches S11 17 though S4 123. If the values of the capacitors C1 109 through C4 123 have a binary relationship, then 16 approximately evenly spaced voltage steps are possible. As the term is used in this specification and the claims, in a "binary relationship", successive values increase by a factor of 2, for example, 1, 2, 4, 8, 16, . . . , etc.

The fact that the switching of the capacitors in the circuit of FIG. 7 provides the output voltage to step fast in discrete steps does not, in any way, mean that the output voltage is constrained to fixed values one step apart. The output voltage can always be adjusted, up or down, by slight fine tuning of the current duty cycle. A change in voltage may involve a step change using capacitor switching to get near the final value nearly instantly, with some additional slewing to get to the final value. The switched capacitor network does not control the steady state voltage. After a step in the output voltage, the feedback control must again take over, to make any final adjustments necessary, and to maintain the steady state voltage level.

It should be noted that if the switch positions b may be taken to a negative voltage source rather than to ground as in the examples discussed. The numbers in the calculations will be different, but all of the discussions of the operating principles are the same. Using a negative source, in its self, does not enable any particular steady state polarity or voltage level. If, prior to a downward step, the voltage is nearly zero, less than the value of the step, then the step will drive the output negative. A negative voltage cannot be sustained unless one or more of the current sources can provide a negative current, either by having a negative polarity or by the arrangement of the switches. An example of the latter is discussed further below, with FIG. 13.

Figure 8:
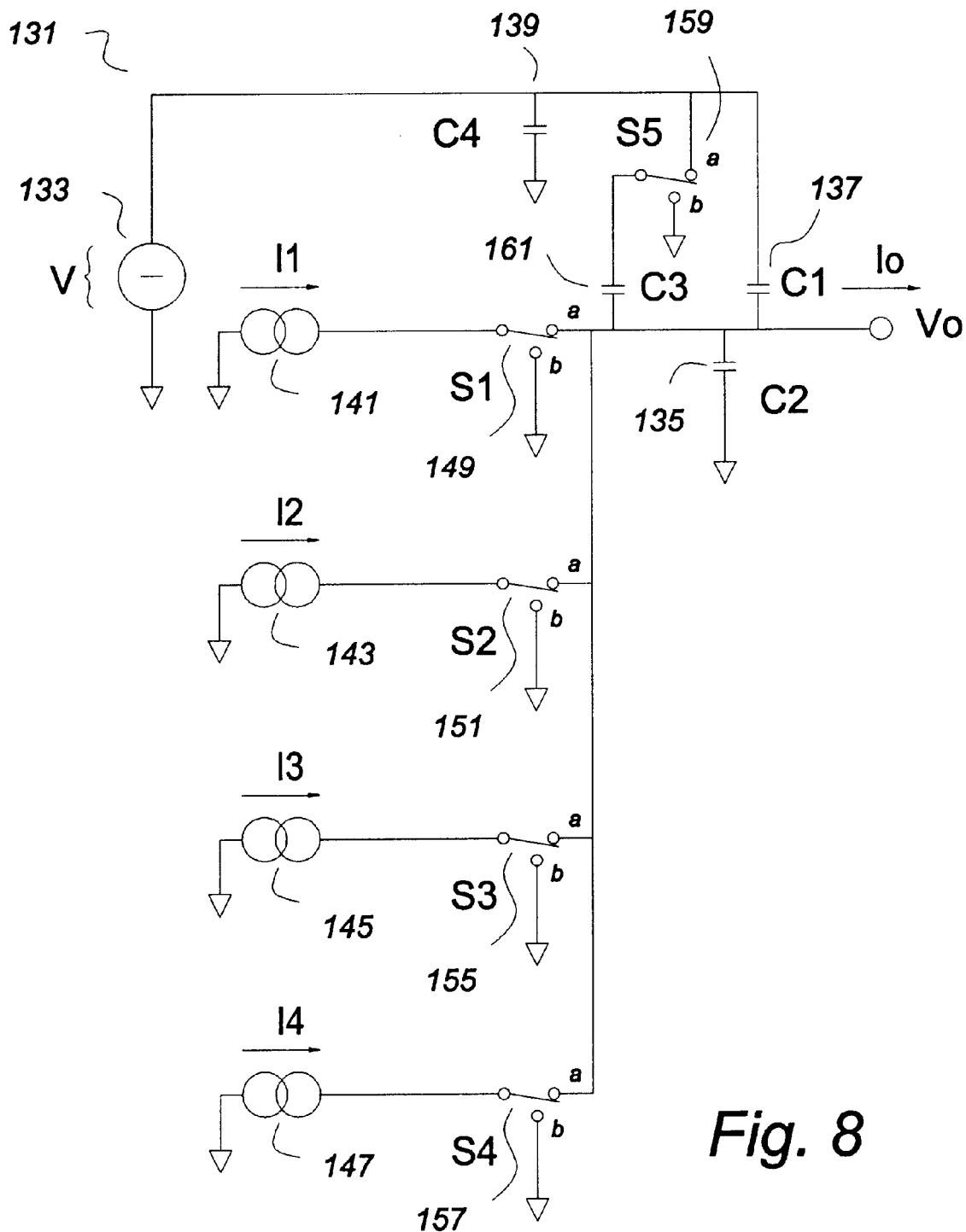
FIG. 8 shows the circuit of FIG. 1 with a switchable capacitor and modified to have four switchable current sources.

FIG. 8 shows a power supply 131, which is similar to the power supply 1 of FIG. 1, except that there are four current sources I1 141, I2 143, I3 145 and I4 147 and four current switchesS1 149, S2 151, S3 155 and S4 157. This arrangement has several advantages which will, in some applications, justify its increased complexity. If the current sources have a binary relationship, then the output current can be incremented in 16 steps just by opening or closing various combinations of the switches. In a binary relationship, successive values increase by a factor of 2, for example, 1, 2, 4, 8, 16, . . . , etc. One or more of the current sources could provide a negative current, so that the output voltage Vo can be negative.

Precise control to intermediate currents requires modulating between two states, and at certain points, for example, seeking a current between states 0111 and 1000, the modulations between states would be undesirable. It is preferred, as an example, not a limitation, that the current be ranged in 8 steps using three of the current sources with their three switches, and the current source and the fourth switch can be modulated, the three ranging switches switching only if the output current range changes. The modulating switch should have more than one least significant step of control, to prevent frequent range switching.

An advantage of such an arrangement is that the steady, constant current into the output capacitance can more nearly equal the load current, significantly reducing the ripple current and/or allowing smaller capacitors to be used. As an example, not a limitation, consider that the input current is adjustable in eight steps of two amperes, and that the output load is nine amperes. By static range switching, eight amperes flows into the capacitor continuously. With nine amperes flowing out, one more ampere must be provided by pulse width modulating the fourth current source. As an example, not a limitation, the fourth currant source may be three amperes, so the duty cycle would be approximately 33 percent. For a given ripple voltage requirement, the output capacitance could be about one eighth the size. This, in turn, reduces proportionately the power lost in voltage transition switching by capacitor switching. Switching losses are also reduced in the current switching circuits, because the bulk of the current is provided through switches that do not switch except to change range. For a given capacitance, the ripple would be one eighth. Obviously, design trade-offs can be done, perhaps reducing both the capacitance size and the ripple voltage by using intermediate values. Further yet, a smaller switch handling a smaller current can operate at a higher frequency. This further reduces the ripple voltage and may increase the response time of the current control function. While the use of so many parts may seem to be very expensive, this is offset to a considerable degree because the net area of silicon required in semiconductor switches is about the same.

In many applications, the power sources may be in one location, and the regulating circuits and the load may be at another. It may be desired to minimize the size and maximize the efficiency of the regulating circuits, and the size and efficiency of the power source circuits may be less important. The use of binary current sources is helpful in this application. With reference to U.S. Pat. No. 4,665,357 FLAT MATRIX TRANSFORMER (by the same inventor, and the specification of which is included herein by reference), binary related currents can be easily implemented using a binary matrix transformer.

If one or more of the current sources is negative, the output voltage and current can be negative as well.

Figure 9:
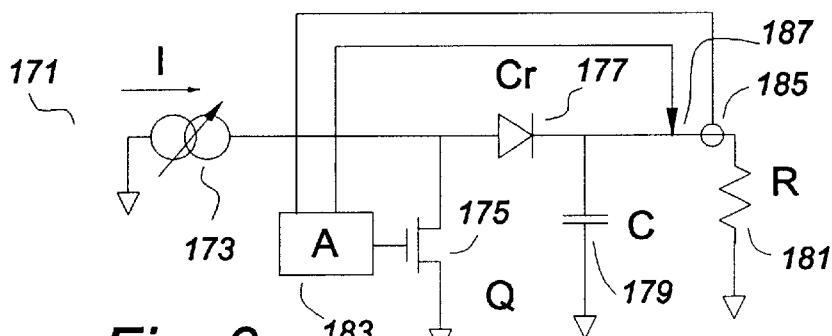
FIG. 9 shows a current control power circuit of this invention.

FIG. 9 shows a current control power supply 171. A current source 173 provides a variable input current I, to accommodate alternative modes of operation. The input current I will have a fixed value equal to the alternative maximum output current while in any one of the alternative modes, but can be changed to another of the alternative maximum output currents for another alternative mode of operation. A switch, shown as an example, not a limitation, as a MOSFET 175, is controlled by a gate drive and control A 183, and conducts the current I to ground while the MOSFET 175 is "ON". When the MOSFET 175 is "OFF", the rectifier Cr 177 conducts the current to a capacitor C 179 and the load, shown as an example, not a limitation, as a resistor R 181. In this example, the output voltage and current are controlled by the modulation of the MOSFET 175. The duty cycle in this circuit is the percentage of time when the MOSFET 175 is "OFF". This circuit can have very fast load regulation, and would be a suitable alternate embodiment of this invention if fast transitions of the output voltage were not needed. The rectifier Cr 177 could alternatively be a synchronous rectifier, given a suitable timing and drive circuit, to reduce conduction losses.

Figure 10:
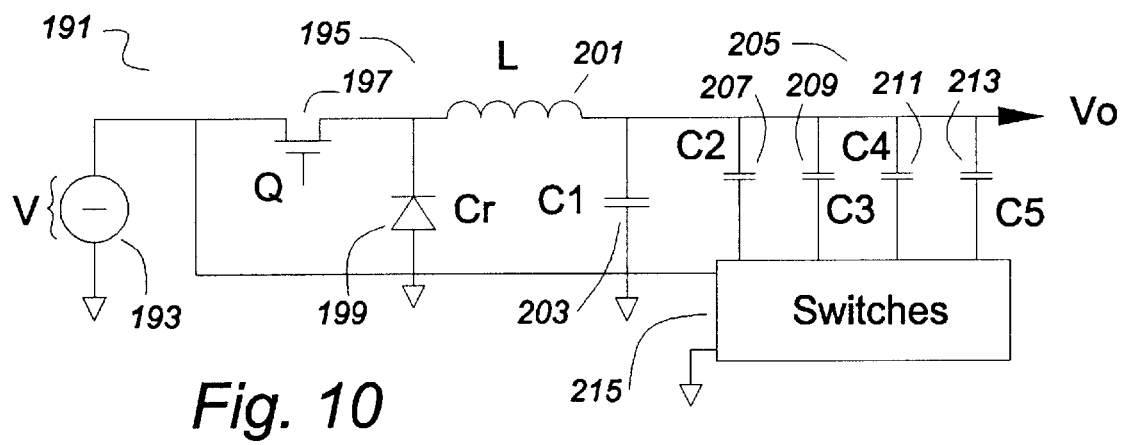
FIG. 10 shows a voltage control power circuit of this invention used with a prior art buck converter.

FIG. 10 shows a power supply 191 having a voltage control circuit 205 of this invention used with a buck converter 195. This circuit would be useful where it was desired to have power supply having very fast transitions in the output voltage, but in which the load regulation and current rise and fall times of a conventional buck converter were sufficient. A voltage source V 193 supplies power to a buck converter 195 comprising a MOSFET switch Q 197, a catch diode Cr 199, an inductor L 201 and an output capacitor C1 203. The voltage control circuit 205, associated with the output capacitor C1 203, comprises capacitors C3 207, C4 209, C 4 211 and C5 213 and a switching circuit "Switches" 215. Voltage control during programmed voltage transitions is similar to that described above in the discussions of the power supply 101 of FIG. 7.

Figure 11:
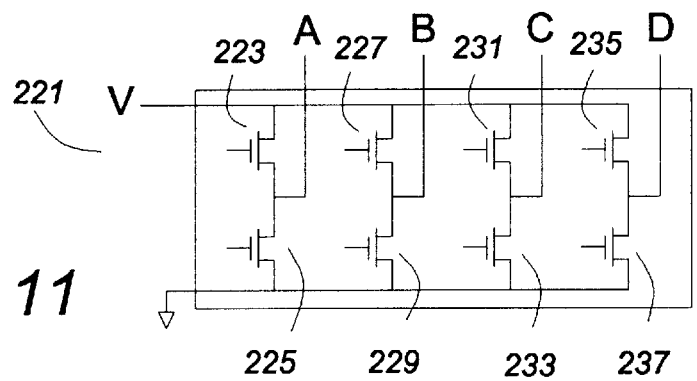
FIG. 11 shows a switching circuit for the circuit of FIG. 10.

FIG. 11 shows a switching circuit 221 which would be suitable as the switching circuit 215, as an example, not a limitation, of FIG. 10. MOSFET's 223, 225, 227, 229, 231, 233, 235 and 237 are "totem pole" drives for outputs A, B, C and D, switching to the voltage rail V or ground. As such, they would be suitable drives for the capacitors C2 207, C3 209, C4 211 and C5 213 respectively of FIG. 10. This switching circuit could be implemented as an integrated circuit, and could include the logic and drivers for the MOSFET's.

Figure 12:
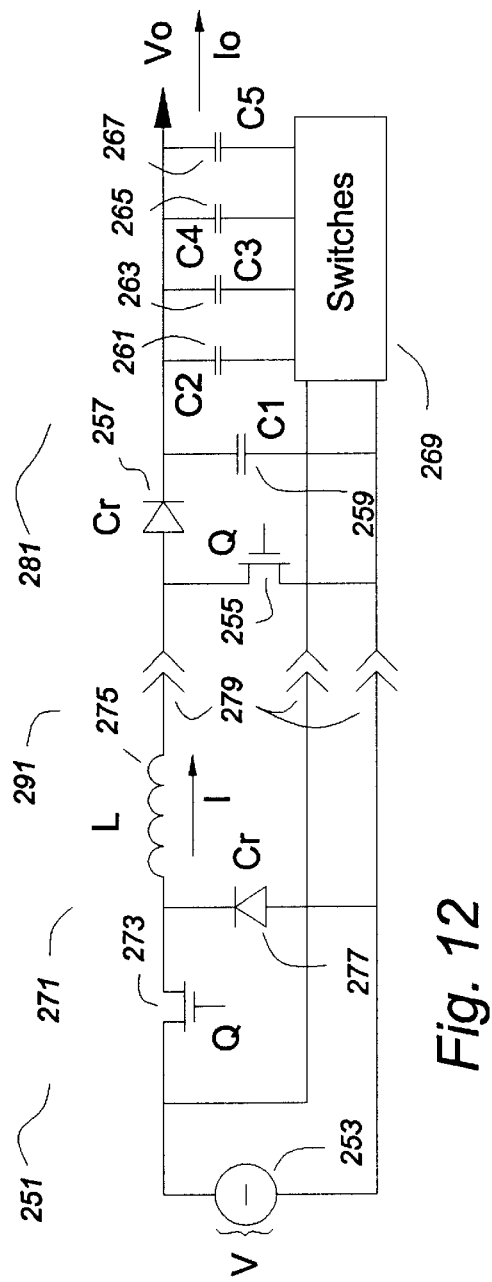
FIG. 12 shows a modular power supply employing current and voltage control of this invention.

FIG. 12 shows a modular power supply 251 comprising an input module 271 and an output module 281. The input module 271 comprises an input current source which is a modified buck converter 291. The output module 281 uses with the current control circuit of FIG. 9 and the voltage control circuit of FIGS. 10 and 11. A voltage source 253 provides power to a current source 271 comprising the modified buck converter front end 291 comprising a MOSTET switch Q 273, an inductor L 275 and a catch diode Cr 277. The current source 271 has a constant current I. The modified buck converter 291 is characterized by having no filter capacitor (though a small filter capacitor, too small to affect the current flow appreciably, may be useful for EMI control).

A connector 279 is shown to indicate that the input module 271 and the output module 281 may be physically separate, with interconnecting wiring. In contrast to prior art modular power supplies, the main power transfer to the output module 281 is a constant current, not a constant voltage. A voltage connection is used, as a housekeeping supply and to power the voltage step transition circuits, but its power capacity is limited for most applications (those where the output voltage is not stepped at a high frequency).

A MOSFET 255 shunts the current I to ground during the "OFF" time of the duty cycle of the output module 281, and a rectifier 257 conducts the current I to a capacitor 259 and the output Vo during the "ON" time of the duty cycle. A switch network 269 selectively switches capacitors C2 261, C3 263, C4 265 and C5 267 to rapidly change the output voltage.

A system is perturbed less, and less EMI is generated if the energy stored in the interconnections is minimized. The energy in the interconnections is one half the current squared times the inductance of the interconnection, plus one half the voltage squared times the capacitance of the interconnection. In a high current, low voltage supply with a load with a changing power demand, a rapidly changing current requires rapidly changing the current component of the stored energy in the interconnection. In the present invention, the current in the interconnection remains constant. The voltage changes, but with a very low output voltage, it is between small values.

Figure 13:
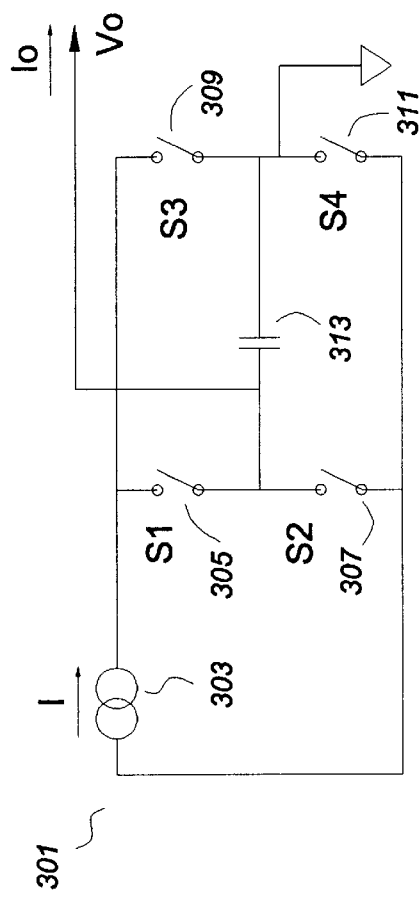
FIG. 13 shows a current control circuit for output voltages of either polarity.

FIG. 13 shows a power supply 301 which has switch arrangement that can provide a positive or negative output voltage Vo and/or current Io from a single polarity current source I 303. Four switches S1 305, S2 307, S3 309 and S4 311 modulate the current flow I into an output capacitor C 313 to provide very fast load regulation in response to changes in the output current Io, and also steer the current flow to provide either polarity of output voltage. In operation, the power supply of FIG. 13 is just like the power supply of FIG. 1, except during the "off" time, both switches S3 309 and S4 311 are closed. This bypasses the current I so that none flows into the output capacitor C 313 or to the output Io.

The "on" state is different for a positive output voltage Vo than it is for a negative output voltage Vo (at steady state). For a positive steady state output voltage Vo, switches S1 305 and S4 311 are closed during the "on" state, and for a negative steady state output voltage Vo, switches S2 307 and S3 309 are closed during the "on" state. Expressed another way, for positive output voltage Vo, the switch S4 311 remains closed, and switches S1 305 and S3 309 modulate to control the current flow into the capacitor C 313 and to the output Io. For a negative voltage output Vo, the switch S3 309 remains closed, and switches S2 307 and S4 311 modulate to control the current flow into the capacitor c 313 and to the output Io.

The power supply of FIG. 13 can be modified to use multiple current sources which may have a binary relationship, and/or it can be modified to incorporate a fast voltage transition circuit which may have multiple switched capacitors which may have a binary relationship.

One skilled in the art of power supply design, and in particular, switched mode power converter design, would be able to design practical circuits using the teachings of this invention. A voltage source can be any DC power supply design. A current source can be the output inductor of a modified buck converter without a large output capacitor and with feed back control so that the input switching means of the modified buck converter is modulated to keep the current within limits. Many designs have a constant current overload mode, which would be suitable, as would other variants. The switching means are preferably solid state switches, such as MOSFET's, SCR's, IGBT's, NPN or PNP transistors, rectifiers and Schottky rectifiers. Other switching means, known now or yet to be discovered can be used. The two position switches for the capacitors can be implemented, as an example, not a limitation, as a pair of MOSFET's. The three position switch can be the same, the open position being a state with both switches "OFF". The two position switches in series with the current sources can be, as an example, not a limitation, a MOSFET to ground and a Schottky rectifier going forward, similar to the familiar boost converter circuitry. Alternatively, two MOSFET's could be used, as a switch and synchronous rectifier circuit, to reduce the forward voltage drop.

The design of the current sources, the voltage sources, and the switching means is not a point of novelty, and would be well known to one familiar with the art. The detail design of the control circuits necessary to implement the timing and sequencing of the various switches also is not a point of novelty, and would be well known to one familiar with the art of logic and control design. The figures are simplified to better show the points of novelty of the invention, realizing that practical circuits would require a number of ancillary circuits such as switch driver circuits, timing circuits, voltage and/or current sense circuits, over voltage circuits, over current and over load circuits, snubbers, heat sinking, packaging, EMI control filters and components, and so forth, all of which are well known by one skilled in the art of power converter design, and, though necessary in a practical product, none are points of novelty and the various choices of implementation are a matter of style of the designer and the unique requirements of different applications.

I claim:

1. A fast transition power supply for supplying an output voltage and an output current to a varying load impedance,
    the output voltage being a variable voltage having at least a first lower voltage level and at least a second higher voltage level,
    the output current being a variable current dependent upon the output voltage and the varying load impedance, and having at least a first maximum rated output current,
    comprising
        an input voltage source for providing an input voltage
        at least a first input current source for providing at least a first input current, the at least a first input current being at least as large as the at least a first maximum rated output current,
        at least a first output capacitor
        a ground return common to the input voltage source, the input current source, the at least a first output capacitor and the varying load impedance,
        a current controlling means comprising
            at least a first current switching means having at least a first current switching state connecting the at least a first input current source to the at least a first output capacitor, and having at least a second current switching state connecting the at least a first input current source to the common ground,
            a first control means for operating the at least a first current switching means such that a percentage of time that the at least a first current switching means is in the at least a first current switching state is generally proportionate to a percentage of the output current to the at least a first maximum rated output current so that an average current flowing into the at least a first output capacitor at steady state conditions is generally equal to the output current,
            the control means further operating the at least a first current switching means so as to incrementally adjust the percentage of time that the at least a first current switching means is in the at least a first current switching state so as to maintain a correct voltage for the output voltage at steady state conditions,
        a voltage step transient controlling means, comprising
            at least a first charge transfer capacitor
                having at least a first lead connected to the at least a first output capacitor for transferring charge to and from the at least a first output capacitor,
                and having at least a second lead connected to at least a first charge switching means,
            the at least a first charge switching means having at least a first charge transfer state in which the at least a second lead of the at least a first charge transfer capacitor is connected to the input voltage source, and having at least a second charge transfer state in which the at least a second lead of the at least a first charge transfer capacitor is connected to the ground return, whereby when the at least a first charge switching means switches from the at least a first charge transfer state to the at least a second charge transfer state a charge is removed from the at least a first output capacitor so as to cause a rapid step decrease in the output voltage and whereby when the at lest a first charge switching means switches from the at least a second charge transfer state to the at least a first charge transfer state, a charge is added to the at least a first output capacitor so as to cause a rapid step increase in the output voltage, and at least a second control means for controlling the at least a first charge switching means in response to an external voltage command input.

2. The fast transition power supply of claim 1 wherein the at least a first input current source is a plurality of input current sources, and the at least a first current switching means is a plurality of current switching means, one of the plurality of current switching means for each one of the plurality of input current sources so that the plurality of current switching means may be operated in various combinations so that the average current flowing into the at least a first output capacitor is generally equal to the output current at steady state.

3. The fast transition power supply of claim 2 wherein the plurality of input current sources have a binary relationship.

4. The fast transition power supply of claim 1 wherein the at least a first charge transfer capacitor is a plurality of charge transfer capacitors, ant the at least a first charge switching means is a plurality of charge switching means, there being one of the plurality of charge switching means for each one of the plurality of charge transfer capacitors, so that the plurality of charge transfer switching means may be operated in various combinations to cause rapid step decreases and increases of various sizes in the output voltage.

5. The fast transition power supply of claim 4 in which the plurality of charge transfer capacitors have a binary relationship.

6. A fast transition power supply for supplying an output voltage and an output current to a varying load impedance, the output current being a variable current dependent upon the output voltage and the varying load impedance, and having a maximum rated output current, comprising at least a first input current source for providing at least a first input current, the at least a first input current being at least as large as the maximum rated output current, at least a first output capacitor a ground return common to the input current source, the at least a first output capacitor and the varying load impedance at least a first current switching means having at least a first current switching state connecting the at least a first input current source to the at least a first output capacitor, and having at least a second current switching state connecting the at least a first input current source to the common ground, and a first control means for operating the at least a first current switching means such that a percentage of time that the at least a first current switching means is in the at least a first current switching state is generally proportionate to a percentage of the output current to the maximum rated current so that an average current flowing into the at least a first output capacitor at steady state conditions is generally equal to the output current, the first control means further operating the at least a first current switching means so as to incrementally adjust the percentage of time that the at least a first current switching means is in the at least a first current switching state so as to maintain a correct voltage for the output voltage at steady state conditions.

7. A fast transition power supply for supplying an output voltage and an output current to a varying load impedance, the output voltage being a variable voltage having at least a first lower voltage level and at least a second higher voltage level, the output current being a variable current dependent upon the output voltage and the varying load impedance, and having a maximum rated output current, comprising an input voltage source for providing an input voltage at least a first output capacitor a ground return common to the input voltage source, the at least a first output capacitor and the varying load impedance at least a first charge transfer capacitor having at least a first lead connected to the at least a first output capacitor for transferring charge to and from the at least a first output capacitor, and having at least a second lead connected to at least a first charge switching means, the at least a first charge switching means having at least a first charge transfer state in which the at least a second lead of the at least a first charge transfer capacitor is connected to the input voltage source, and having at lest a second charge transfer state in which the at least a second lead of the at least a first charge transfer capacitor is connected to the ground return, whereby when the at least a first charge switching means switches from the at least a first charge transfer state to the at least a second charge transfer state a charge is removed from the at least a first output capacitor so as to cause a rapid step decrease in the output voltage and whereby when the at lest a first charge switching means switches from the at least a second charge transfer state to the at least a first charge transfer state, a charge is added to the at least a first output capacitor so as to cause a rapid step increase in the output voltage, and at least a first charge control means for controlling the at least a first charge switching means in response to an external voltage command input.

8. The fast transient power supply of claim 1 having at least a first and a second mods of operation the first and the second modes of operation being characterized by having, respectively, at least a first and a second alternative value of the maximum rated output current and wherein the at least a first input current source is adjustable so that the at least at least a first input current may be adjusted to be at least as large as the first and the second alternative maximum rated output current, respectively, during the first and the second modes of operation.

9. The fast transition power supply of claim 1 in which the at least a first input current source is a modified buck converter characterized by having at least one of a small filter capacitor and no filter capacitor.

10. The fast transition power supply of claim 1 in which the input voltage source may be varied so as to vary the charge transferred to the at least a first output capacitor so as to adjust the rapid step increase and the rapid step decrease of the output voltage.

11. The fast transient power supply of claim 1 wherein a first module comprises at least one of the input voltage source and the at least one input current source, and wherein at least a first second module comprises at least one of the current controlling means and the voltage step transient controlling means.

* * * * *